Dec. 13, 1932.  A. SPENCER  1,890,795
INDIA RUBBER SPRING
Filed May 3, 1929   2 Sheets-Sheet 1
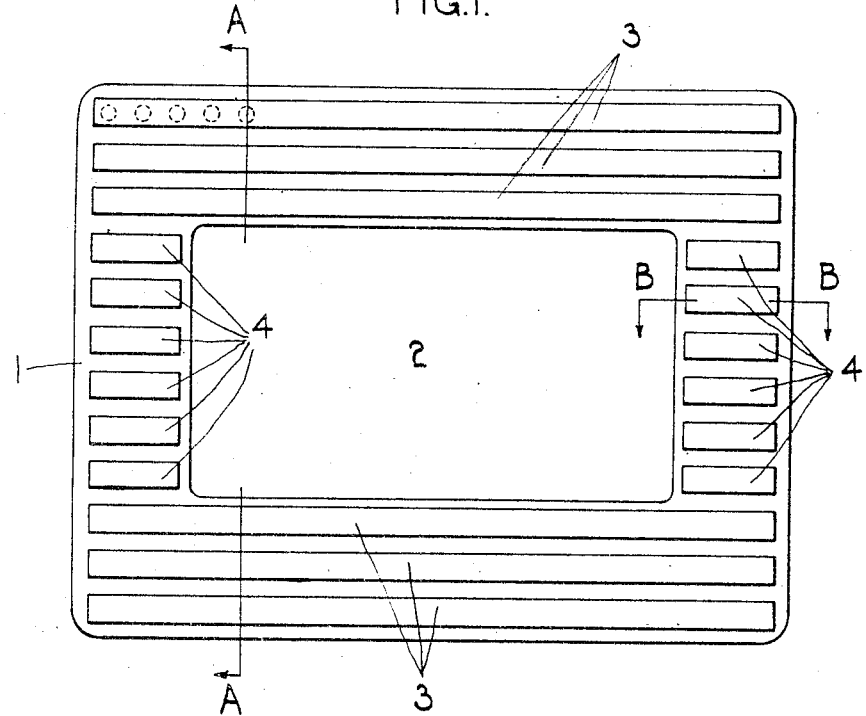
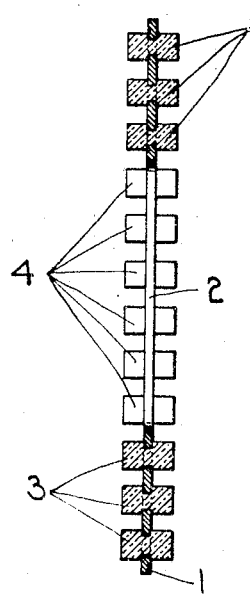
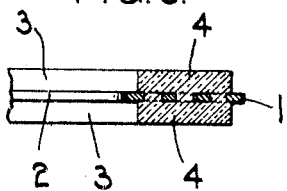

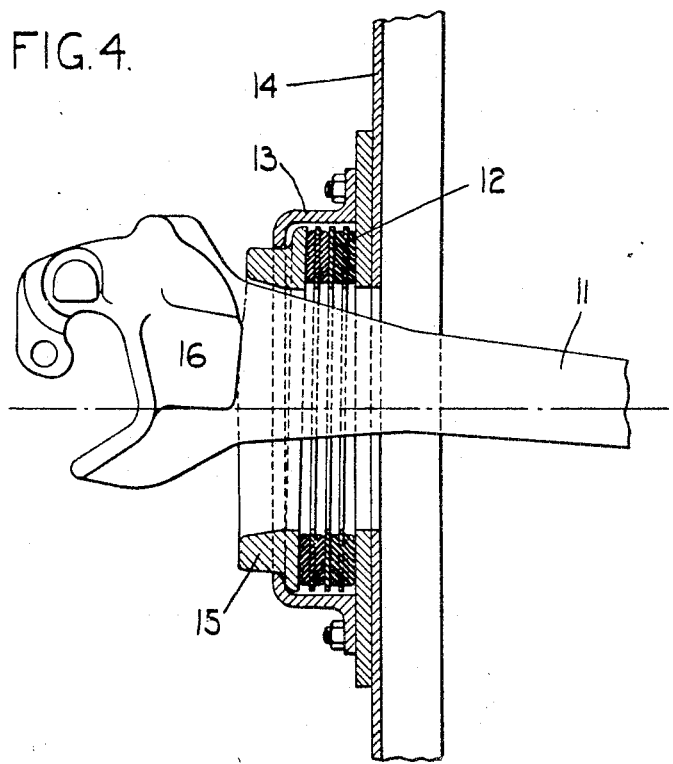
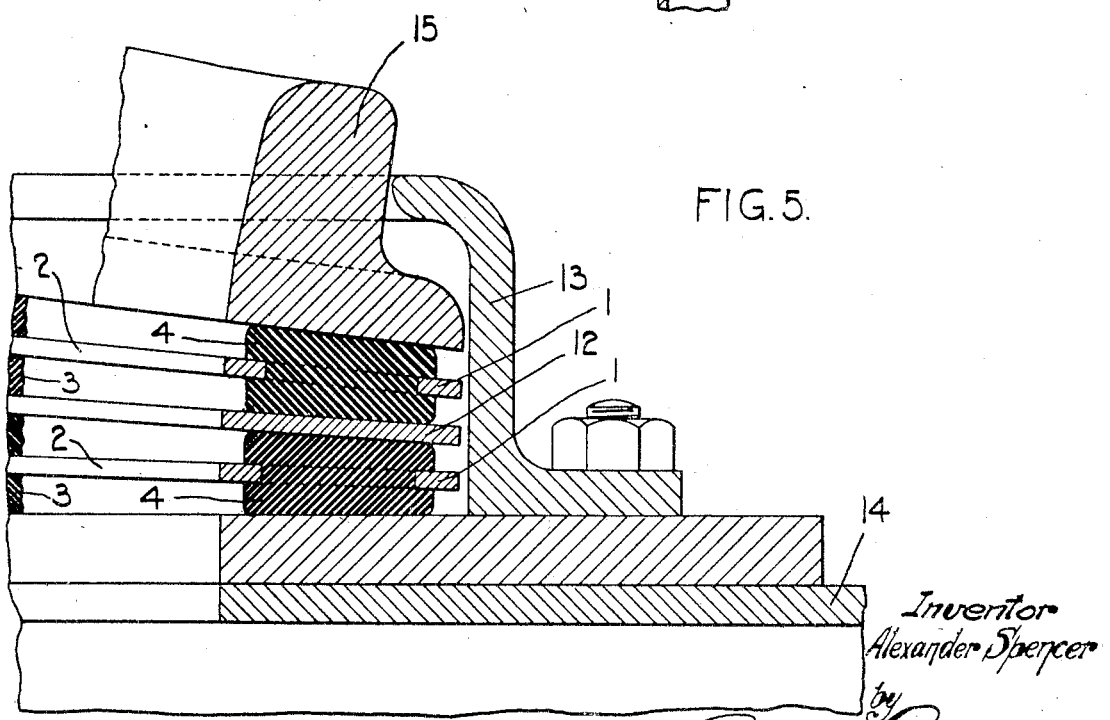

Patented Dec. 13, 1932

1,890,795

UNITED STATES PATENT OFFICE

ALEXANDER SPENCER, OF LONDON, ENGLAND

INDIA-RUBBER SPRING

Application filed May 3, 1929, Serial No. 360,293, and in Great Britain April 9, 1929.

This invention relates to india-rubber buffing springs for use in conjunction with the central buffing and draw gear of railway and like vehicles.

Certain usual constructions of such springs comprise a number of units arranged in column form, each unit consisting of concentric frames of rubber of rectangular cross section moulded on to a metal plate of substantially rectangular shape, the metal plate serving to maintain the rubber frames the desired distance apart and being formed with holes through which extends rubber that connects the rubber frames at one side of the plate to the rubber frames at the other side thereof. Between the several units constituting a column metal dividing plates are arranged.

The moulds for making such spring units are necessarily somewhat costly as the grooves of rectangular cross section to receive the rubber that forms the said frames of rubber must of course be in the form of closed substantially rectangular loops corresponding in shape to the frames of rubber in the finished spring unit. These closed loop recesses are expensive to cut in the metal of the mould.

The object of the present invention is to provide a construction of spring unit which can be manufactured in moulds less costly to make and in which the rubber is so disposed as to present an improved resistance under compression in cases where the compression force is not absolutely axial, that is to say in cases where the spring units become slightly inclined to the axis of the spring and are consequently subjected to greater compression at one side of the axis than at the other.

Further and favourable objects will appear from the following description.

According to the invention an outside buffing spring for central gear comprises a column of india-rubber units separated by metal plates each unit consisting of a rectangular metal plate having a central hole to pass the coupler shank, perforations extending transversely of the plate, and parallel straight bars of india-rubber extending across each face of the plate and united through said perforations in such manner that each bar is subjected to uniform and symmetrical lateral stress when buffing on curves.

Reference will now be had to the accompanying drawings, wherein,—

Fig. 1 is a front view of an india-rubber spring unit according to the invention, Figs. 2 and 3 being cross sections taken on the lines A—A and B—B respectively of Fig. 1.

Fig. 4 is a horizontal section showing the outside buffing spring according to the invention encircling a coupler shank and mounted on a vehicle end sill or headstock.

Fig. 5 is a detail section of a portion of the spring shown in Fig. 4 illustrating the reaction of the elements to an inclined thrust such as occurs when buffing on curves.

Referring now to the drawings but first more particularly to Figs. 1 to 4, each spring unit comprises a rectangular or quasi-rectangular metal supporting plate 1 having a central rectangular hole 2 large enough to pass the coupler shank 11 and to permit the free lateral swing of such coupler shank when rounding curves.

Projecting from opposite faces of the metal plate 1 are parallel straight bars of india-rubber, the bars above and below the rectangular hole 2 being indicated at 3 and extending for substantially the full width of the plate 1, while the intermediate short bars indicated at 4 extend from adjacent the hole 2 to the edges of the plate 1.

The coincident bars projecting from opposite faces of the plate are united by india-rubber moulded through perforations 5 in said plate, the preferred method of manufacture consisting in moulding the bar elements 3 and 4 to the opposite faces of the plate with their junctions through the perforations 5 in situ.

It will be noted more clearly from Figs. 1 and 2 that the bars are equidistantly spaced and are parallel to each other and to the upper and lower edges of the plate 1.

Referring now more particularly to Figs. 4 and 5, the outside buffing spring comprises a plurality of units such as illustrated in Fig. 1 with an intermediate metal separating plate 12, the spring being located in a housing 13 securely mounted on the outer face of the vehicle end sill or headstock 14 co-axial with the draft gear.

Also mounted within the casing 13 is a flanged follower 15 for the operation of the outside buffing spring, the follower being engaged by the coupler head 16 when the latter is moved inwardly under buffing stress.

Under normal buffing conditions, for example when buffing on a straight track, the coupler shank 11 will be disposed in the longitudinal axis of the vehicle, and the coupler head 16 will, after a predetermined move, strike the follower substantially centrally so that a uniform compression of the outside buffing spring will occur in cushioning the impact.

Under other conditions, however, for instance when buffing on curves, the coupler shank will be inclined to the longitudinal axis of the vehicle, and under these conditions the compression of the outside buffing spring will not be symmetrical but the side of the spring to which the shank is inclined will undergo a considerably larger degree of movement as clearly shown in Figs. 4 and 5 where these conditions are represented.

It will be noted that under these conditions where load is applied at an inclination the bars of the spring are affected longitudinally, in which direction they possess maximum inherent stability, while the lateral stress is symmetrical in both directions in contradistinction to the effects produced in annular or frame-type springs where there is an unbalanced inward stress tending to tear the rubber rings from their supporting plates.

The transverse sections illustrated in Figs. 4 and 5 are taken through the apertured portion of the supporting plates 1 and so only the short bars 4 are shown in section, but it will be appreciated that the longitudinal stability of the longer bars 3 located above and below the aperture 2 is even greater than that of the short bars 4, so that considerable and uniform resistance to inward movement obtains.

Moreover, it will be appreciated that moulds for making the spring units according to the invention are relatively cheap to make since the recesses receiving the rubber for the formation of the straight bars 3 and 4 can be simply planed or slotted as straight parallel grooves.

Any number of the improved units may be assembled in series, and the invention is not restricted to any particular arrangement or number of bars on the supporting plates, while in certain cases interrupted or non-continuous bar-type elements can be substituted for the longer bars 3 above and below the central hole of the supporting plate. Referring now to the claims:—

What I claim is:—

1. An india-rubber spring unit comprising a rectangular metal plate having parallel perforations and straight bars of india-rubber extending parallelly across said plate on both sides thereof united through said perforations and operative on force being applied at an inclination to be stressed uniformly in both lateral directions.

2. An india-rubber spring unit adapted to surround the coupler shank comprising a rectangular metal plate having a central rectangular hole to pass the coupler shank and permit lateral movement thereof and parallel perforations in the body of the plate surrounding said holes with straight bars of india-rubber extending across both faces of the plate united through said perforations in such manner that force applied at an inclination, by the coupler head, causes uniform and symmetrical lateral stress to such bars.

3. An india-rubber spring unit adapted to surround the coupler shank comprising a rectangular metal plate having a central rectangular hole to pass the coupler shank and permit lateral movement thereof and parallel perforations in the body of the plate surrounding said holes with rectangular section parallel straight bars of india-rubber extending across both faces of the plate united through said perforations in such manner that force applied at an inclination, by the coupler head, causes uniform and symmetrical lateral stress to such bars.

4. An outside buffing spring for central gear comprising a column of india-rubber units separated by metal plates each unit consisting of a rectangular metal plate having a central hole to pass the coupler shank, perforations extending transversely of the plate and parallel straight bars of india-rubber extending across each face of the plate united through said perforations in such manner that each bar is subjected to uniform and symmetrical lateral stress when buffing on curves.

In testimony whereof I affix my signature.

ALEXANDER SPENCER.